Dec. 15, 1942.    F. W. CURTIS    2,304,779
TOOL HEAD UNIT
Filed Jan. 18, 1941    4 Sheets-Sheet 1

INVENTOR
FRANK W. CURTIS
BY Chapin & Neal
ATTORNEYS

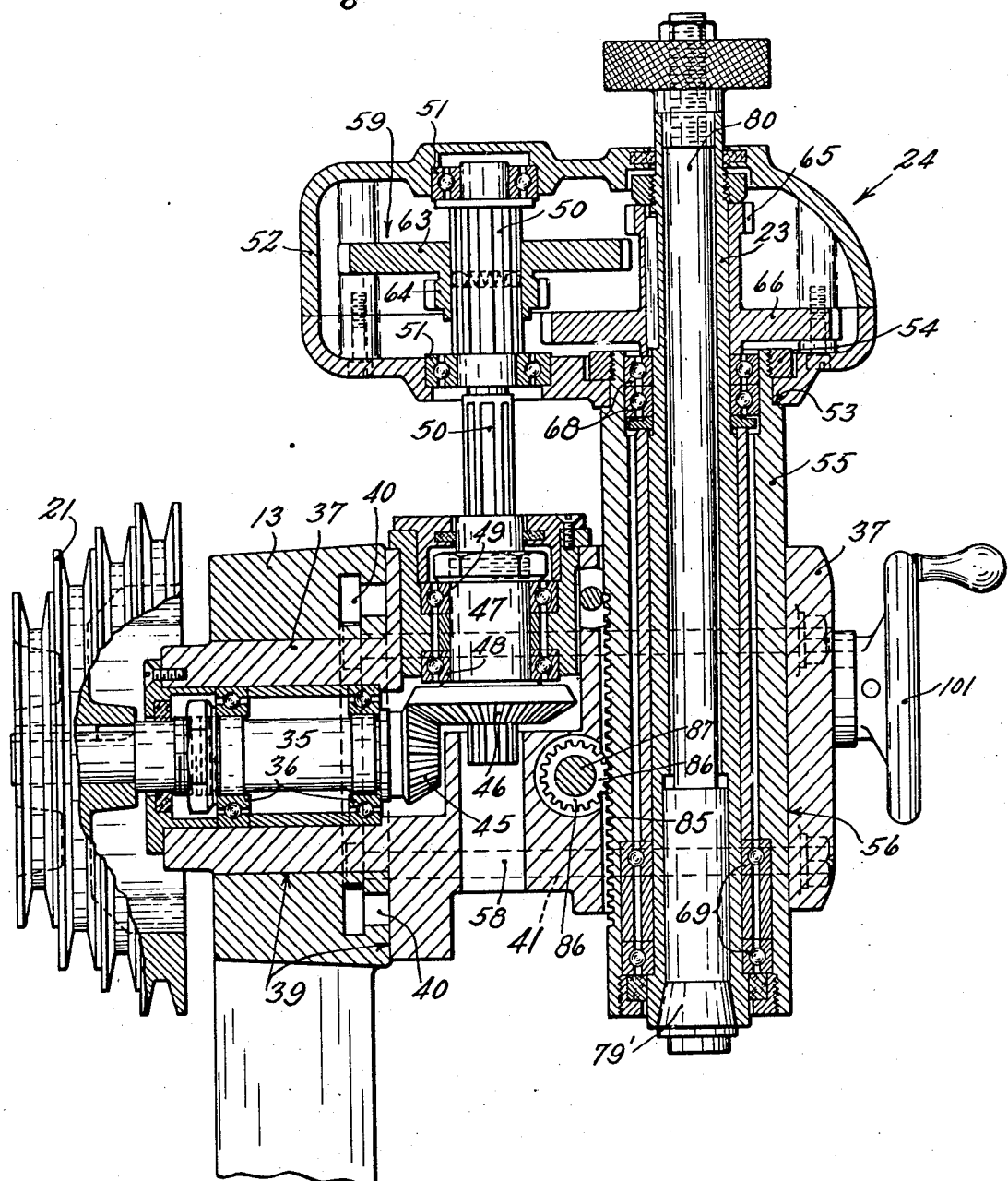

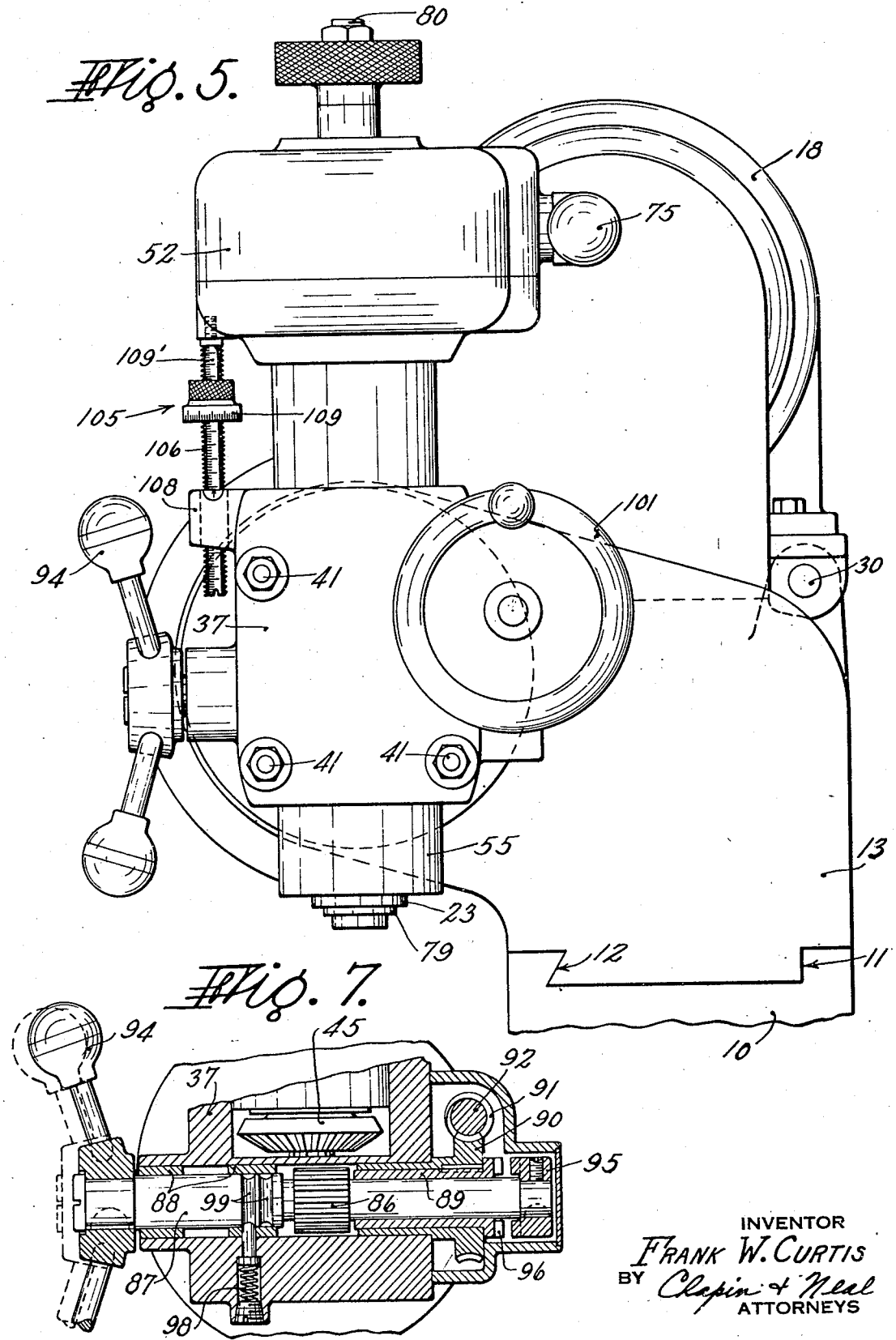

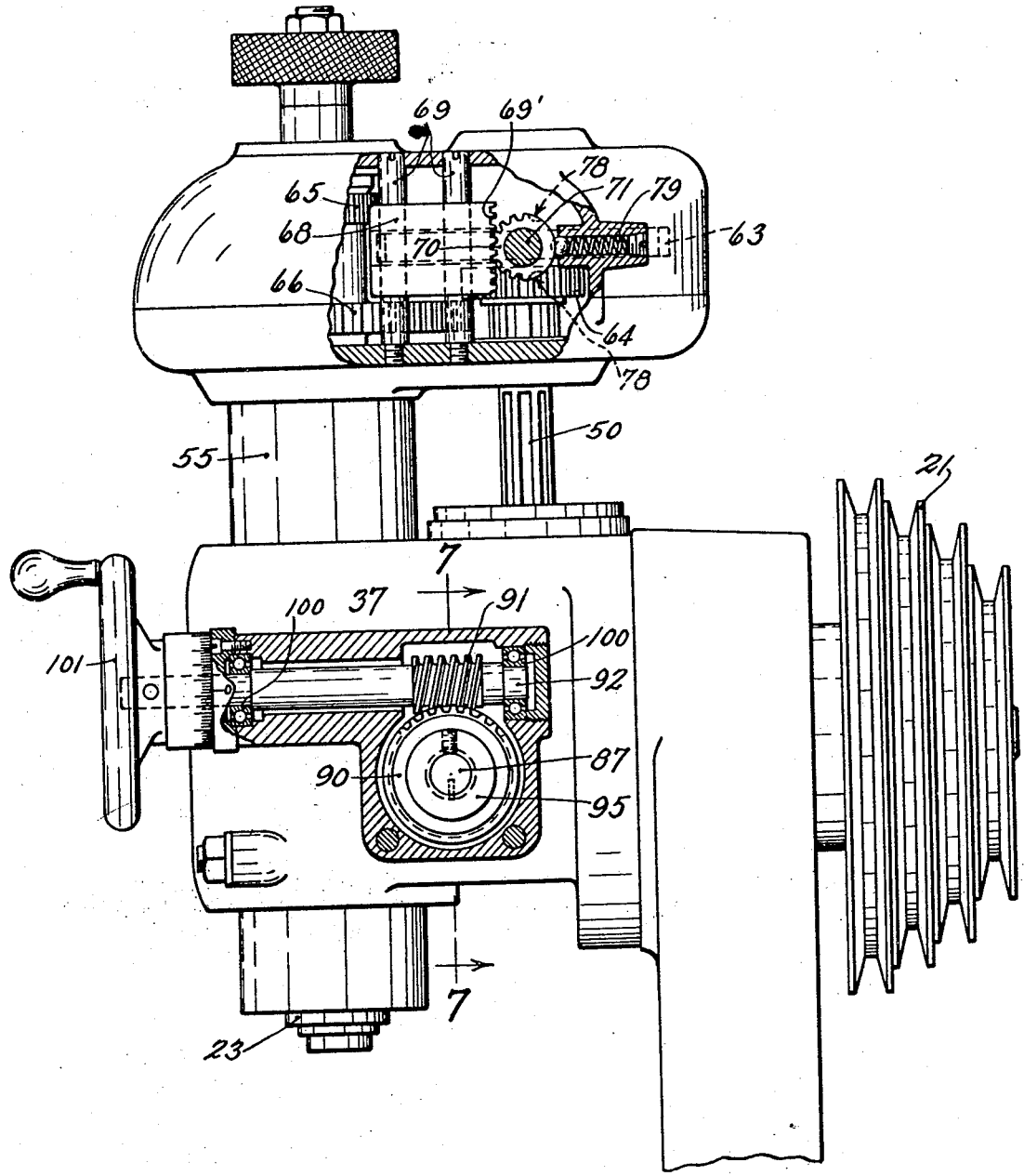

Patented Dec. 15, 1942

2,304,779

UNITED STATES PATENT OFFICE 2,304,779

TOOLHEAD UNIT

Frank W. Curtis, Springfield, Mass., assignor to Van Norman Machine Tool Company, Springfield, Mass., a corporation of Massachusetts Application January 18, 1941, Serial No. 374,963

6 Claims. (Cl. 90—17)

This invention relates to an improved tool head unit for use with machine tools. In particular, it relates to such a unit having its own independent prime mover and adapted to be used as an auxiliary unit in conjunction with milling machines, planers, heavy drill presses and similar machines to provide an extra tool holder, or to be used to replace the existing tool holders where it is desired to provide for longitudinal as well as angular adjustment of the axis of rotation of the tool.

One object of the present invention is to provide a tool head unit which is so constructed that it may be operated at either high speeds such as for use in drilling, or at lower speeds such as for use with milling cutters without placing abnormal stresses on gears of the driving mechanism due to the change of relative speeds of rotation necessary for the different types of work. A further object is to produce such a unit which is sufficiently rigid for precision work though the unit itself is compact enough to be used as an attachment. An additional object is to provide a tool head unit in which a minimum number of operating parts are associated to give a wide range of operating speeds.

The mechanism whereby I obtain the foregoing and other objects will be clear from the following description taken in conjunction with the accompanying drawings in which:

Fig. 4 is a sectional view taken on line 4—4 of Fig. 2, but on a larger scale;

Fig. 5 is a front elevation of Fig. 4;

Fig. 6 is a side elevation of Fig. 5, partly broken away to show features of the operating mechanism; and Fig. 7 is a sectional view of a portion of Fig. 6 taken on line 7—7 of Fig. 6.

Figure 1:
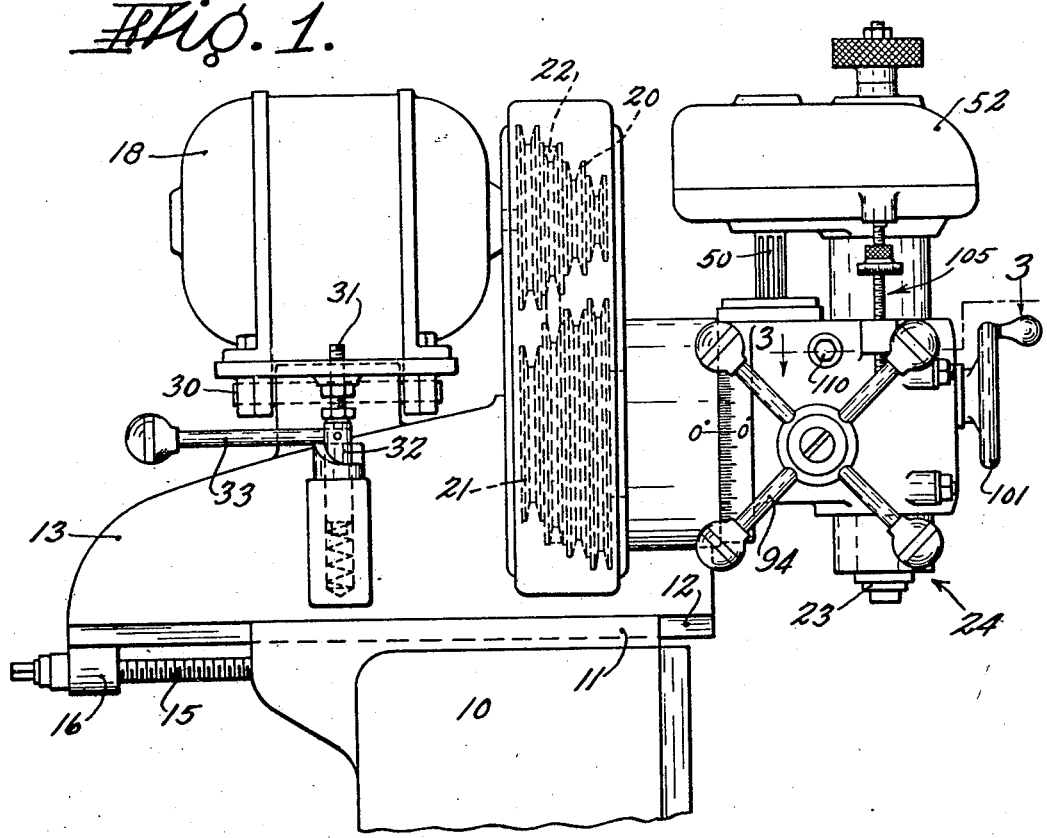
Fig. 1 is a general view of the unit mounted on top of the column of a small hand milling machine.

Referring to Fig. 1, I have shown the tool head unit attached to the top of a column 10 of a milling machine by means of complementary ways 11 and 12 formed respectively on the top of the column and on the base 13 of the unit. A screw 15 journaled as at 16 in one end of the base is provided with a squared end and is suitably threaded into the column, thus permitting the tool unit to be adjusted longitudinally of the ways.

The unit itself comprises an electric motor 18 which, through cone pulleys 20 and 21 and belt 22, as well as intermediate gearing to be described later, drives the spindle 23 of a spindle head 24 which is angularly adjustable around the axis of rotation of the pulley 21. In addition, as will be explained in further detail, the spindle 23 can be axially adjusted.

Motor 18 is pivotally mounted at one side of its base on a rod 30 while the opposite side of its base is provided with an adjustable abutment 31 which in turn cooperates with a plunger 32 of a belt tightening device. This plunger 32 is raised and lowered by swinging a handle 33 around a vertical axis through plunger 32. In this way the motor is rocked on rod 30 and this action serves to tighten and loosen belt 22 whereby sufficient friction is insured for driving purposes between pulleys 20 and 21 and at the same time the belt can be easily shifted from one set of the stepped pulleys to the other when a change of speed is desired.

As appears in Fig. 4, pulley 21 is keyed to one end of a main drive shaft 35 journaled as by bearings 36 in the body 37 of the spindle head 24. The body 37 in turn is journaled in the base 13 concentrically with shaft 35 as at 39. By this arrangement, body portion 37 can be angularly adjusted around the axis of shaft 35. An annular T-slot 40 is provided in the base 13 as shown and bolts 41 serve to secure the body in any desired position of angular adjustment. At the end of shaft 35 opposite to the pulley 21 is secured a bevel gear 45 which meshes with a bevel gear 46. Gear 46 is provided with a hollow hub 47 and is journaled in the body portion 37 by means of bearings 48 and 49 as shown. Extending axially through the hollow hub 47 is a splined shaft 50 which meshes with complementary splines formed on the inner cylindrical surface of the hub in a well-known manner.

Shaft 50 is journaled in bearings 51 in a gear case 52 which in turn is mounted by engagement of shoulders 53 and nut 54 in the upper end of a sleeve 55. Sleeve 55 in turn is slidably journaled as at 56 in the body 37. Thus when sleeve 55 is adjusted axially, the spline shaft will slide axially of the hub 47, the body 37 being provided with an opening 58 to accommodate the spline shaft 50 when the sleeve is fully extended in its lower position.

At its upper end, and within the gear case 52, shaft 50 carries a gear couplet 59 consisting of a high speed gear 63 and a low speed gear 64. As is clear from the drawings, couplet 59 is splined on shaft 50 and may be moved in either direction from its intermediate position of Fig. 4 to engage the gears 63 or 64 with gears 65 or 66 carried on the upper end of spindle 23 journaled by bearings 68 and 69 in the sleeve 55. In this way either a high speed drive can be imparted to spindle 23 from shaft 50 through gears 63 and 65 or a low speed drive through gears 64 and 66.

With this arrangement, gears 45 and 46 can be designed for operation at the range of speeds determined by the different positions of the belt on pulleys 20 and 21 and their speed never goes beyond this range. Shaft 50 operates at a constant speed for any arrangement of the pulleys 20 and 21 with the belt 22 and change from high to low speed operation of the spindle is obtained by changing the gear ratio between shaft 50 and the spindle 23. Therefore, gears 63 and 65 can be designed for high speed operation at light loads, whereas gears 64 and 66 will be designed for low speed operation at heavier loads and when the spindle is being operated at high or low speeds the proper gears 63, 65 or 64, 66 will be used. This is to be differentiated from the case in which no change gears are utilized at this point and change in speed accompanying a change in load is accomplished by varying the speed of the drive shaft 50. The present arrangement results in a very sturdy and dependable drive which permits the tool head unit to have a wide applicability without danger of damage to its drive.

Figures 2, 3:
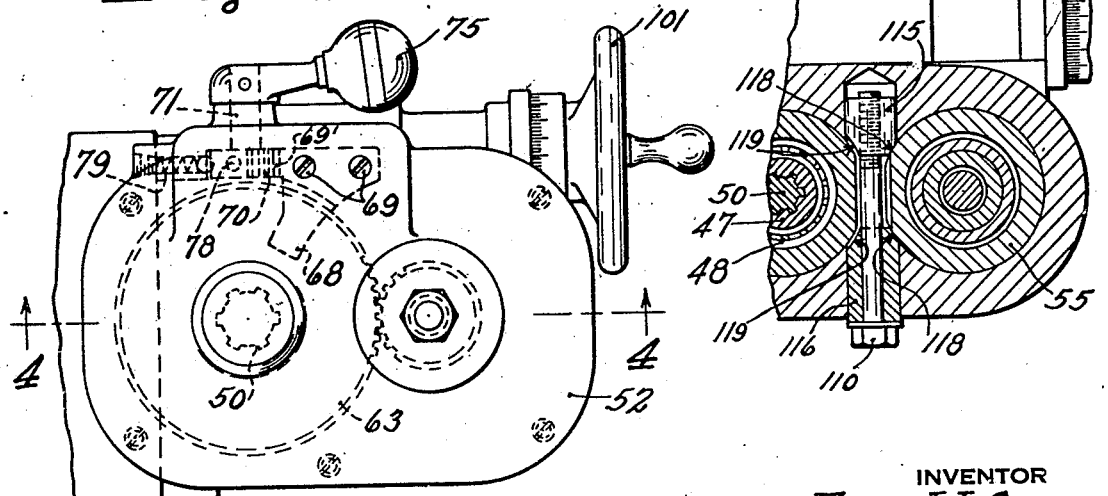
Fig. 2 is a top plan view of the right hand portion of the tool holding unit of Fig. 1.
Fig. 3 is a sectional view taken on line 3—3 of Fig. 1.

Referring to Figs. 2 and 6, the upper gear 63 of gear couplet 59 is engaged on its upper and lower surfaces by the cooperating surfaces of a shifter 68 slidably mounted on a pair of studs 69 attached to the gear case as shown. Along one edge, shoe 68 has gear teeth 69' which are engaged by the teeth of a gear member 70 fixed on one end of a stub shaft 71 extending laterally through the gear case and provided with a handle 75 on its outer end. By raising or lowering handle 75 from the position shown in Fig. 5, either gears 63 and 65 or 64 and 66 will be engaged. To insure that the gear couplet is correctly positioned in either of its engaged positions or in its neutral position, gear 70 is provided with teeth for only a portion of its circumference and has depressions 78 formed on the blank portion of its circumference which cooperate with a spring pressed detent mechanism 79 in any of the three positions of the gear couplet.

In operation, a tool (not shown) may be supported in the spindle by a collet 79' which is drawn into engagement with the spindle by draw rod 80, see Fig. 4. To provide for control of the axial adjustment of the spindle when a tool is operating on work a sleeve adjusting mechanism is used. On its external surface the sleeve is provided with rack teeth 85 which are engaged by the teeth on a gear 86 fixed on a shaft 87 extending transversely of the body 37. This shaft is loosely journaled at one end in a pair of sleeve bearings 88 mounted in the body 37. At its opposite end the shaft is loosely journaled in a sleeve bearing 89 on which is keyed a worm wheel 90 journaled for rotation in the body 37 and in engagement with a worm 91 preferably formed integrally on a shaft 92 extending at right angles to shaft 87. Thus, by means of a handle 94 attached at one end, shaft 87 can be rotated to raise the sleeve 55 up and down through cooperation of the rack 85 and gear 86. By this means the sleeve can be adjusted rapidly, for instance when the tool head unit is being used for drilling.

For purposes of die sinking or certain types of milling a finer adjustment of the sleeve may be desirable. To this end the following mechanism is provided. As can be seen in Fig. 7, there is clearance between the gear 86 and both of the bearings 88 and 89. Thus the shaft 87 can be shifted laterally from the position shown to that represented by the dotted position of the handle by pulling on this last member. At the end opposite the handle, a clutch member 95 is fixed to the shaft and, in the shifted position of the handle above referred to, this clutch member will engage with a complementary clutch member 96 formed integrally on sleeve 89, thus tying the shaft to the worm for rotation by the latter. A detent mechanism 98 is provided for cooperation with a pair of annular grooves 99 to maintain the shaft 87 in either of its lateral positions. Shaft 92, on which worm 91 is fixed, is journaled in bearings 100 and extends to the front of the body 37, a hand wheel 101 being mounted in the forward end of the shaft as shown. As is plain, this particular arrangement is very convenient because all that needs to be done to change from a rapid to a slow sleeve feed is to pull out the handle 94 to the dotted line position of Fig. 7 and turn the hand wheel 101.

As an additional feature for fine adjustment of the axial position of the sleeve, an adjustable stop device 105 is provided. This device consists of a threaded stud 106 having a shouldered end by which it is screwed into the bottom of the gear box with the free end extending loosely through a boss 108 on the body 37. A collar 109 is threaded onto stud 106 and may be adjusted to engage the boss 108 when the sleeve has been extended downwardly the desired amount. As is indicated, the cylindrical surface of the stud 106 may be ground down as at 109' to provide a flat surface on which indicia may be inscribed for cooperation with other indicia inscribed on the skirt of the collar 109 to permit accurate adjustment of the extended position of the sleeve.

Referring to Figs. 1 and 3, the sleeve may be locked in any position of axial adjustment by tightening the bolt 110. This bolt extends transversely of the body 37 between the sleeve 55 and the mounting for the hub 47 of the bevel gear 46, and threadably engages a cylindrical abutment member 115 which is positioned in a recess formed in the body beyond the sleeve. Loosely mounted on the bolt between the sleeve and the head of the bolt is a second cylindrical abutment member 116. At their ends nearest the sleeve both members 115 and 116 are beveled as at 118 and 119. The dimensions of the beveled portions are such that when the bolt is tightened and the members 115 and 116 are forced towards each other, the bevels 118 will abut the sides of the sleeve while the bevels 119 will clear the mounting for the hub 47.

As will be apparent from the foregoing description, the prime mover is located in the heavy base while the body supports only the sleeve and drive from the prime mover to the spindle. In this way, even under heavy loads involving the use of a large prime mover, the unit will be exceptionally rigid and steady as there is no unbalanced mass on the body portion due to the support of a prime mover on that part. This feature of rigidity is particularly valuable for units of this nature. The foregoing and the other advantages of accuracy of axial sleeve adjustment and minimum number of parts in addition to the design of the drive to effect high and low speeds results in a vastly superior machine tool unit for the purpose described.

What I claim is:

1. In a tool head unit, a body portion, means to mount said body portion on a supporting member for adjustment in a first direction in a first plane, a sleeve mounted for axial adjustment in a second plane at right angles to said first plane and normal to said first direction, a spindle carried by said sleeve for axial adjustment therewith, a gear box mounted at one end of said sleeve, a drive shaft extending parallel to the sleeve from the gear box to the body portion, change gearing located in the gear box and connecting the drive shaft and the spindle, said change gearing comprising final drive members of different ratio on the spindle engageable selectively by a plurality of complementary drive members on the drive shaft, a main driver journaled in the body portion parallel to the first plane, gearing between the main driver and the drive shaft, and a prime mover connected in driving relation to the main driver.

2. In a tool head unit, a base portion, means to mount said base portion on a supporting member for adjustment in a first direction in a first plane, a body portion journaled in said base portion for angular adjustment around an axis perpendicular to a second plane normal to said first plane, a sleeve mounted in the body portion for axial adjustment in a third plane parallel to said second-named plane, a spindle carried by said sleeve for axial adjustment therewith, a gear box mounted at one end of said sleeve, a drive shaft extending parallel to the sleeve from the gear box to the body portion, change gearing located in the gear box and connecting the drive shaft and the spindle, said change gearing comprising final drive members of different ratio on the spindle engageable selectively with a plurality of complementary drive members on the drive shaft, a main driver journaled in the body portion concentric with said axis, gearing between the main driver and the drive shaft, and a prime mover carried on the base and connected in driving relation to the main driver.

3. A tool head unit comprising a base, a body portion rotatably mounted in the base for angular adjustment around an axis in the base, a sleeve member carried by the body portion and axially movable relative to the body portion, means for adjusting the axial position of the sleeve comprising a rack on the sleeve, a shaft in the body portion reciprocable axially from a first position to a second, a gear fixedly carried by the shaft and engaged with the rack in either position of the shaft, a worm wheel loosely journaled on the shaft, clutch means fixed on the shaft and clutch means on the worm wheel engageable in the second position of the shaft, a second shaft transverse to the first shaft, a worm fixed on the second shaft and in engagement with the worm wheel, a handle on the first shaft for shifting the shaft from the first position to the second or for turning the shaft in the first position and a handle for turning the second shaft.

4. A tool head unit comprising a base, a body portion rotatably mounted on the base for angular adjustment around an axis in the base, a sleeve member carried by the body portion and axially movable relative to the body portion, means for adjusting the axial position of the sleeve comprising a rack on the sleeve, an axially movable and bodily rotatable shaft in the body, a gear fixed on the shaft and engaging the rack during both motions of the shaft, a handle attached to the shaft for direct rotation, a second shaft, means to rotate the second shaft, reduction gearing between the first and second shafts, and clutch means for engaging and disengaging drive between said reduction gearing and first shaft, said clutch means being rendered effective to engage said drive by axial movement of the first shaft.

5. In a spindle unit, a body portion, means to mount said body portion on a supporting member for adjustment in a first direction in a first plane, a spindle carrier supported on said body portion for adjustment at right angles to the first plane, a spindle rotatably supported by the spindle carrier, a gear box mounted at one end of the carrier, a drive shaft extending parallel to the spindle from the gear box to the body portion, change gearing located in the gear box and connecting the drive shaft and the spindle, said change gearing comprising final drive members of different ratio on the spindle engageable selectively by a plurality of complementary drive members on the drive shaft, a main driver journaled in the body portion parallel to the first plane, a first bevel gear carried by the main driver, a complementary bevel gear journaled in the body portion and splined to said drive shaft in overlying relation to and meshing with the first bevel gear, and a prime mover connected in driving relation to the main driver.

6. A tool head unit comprising a base, a prime mover in the base, a body portion pivotally mounted for angular adjustment around an axis in the base, a main driver in said body portion mounted concentrically with said axis and driven by the prime mover, a bevel gear connection from said main driver, a drive shaft at right angles to the main driver and having a slidable coupling to said bevel gear connection, a sleeve mounted in the body portion for longitudinal movement parallel to the drive shaft, a gear case receiving both the sleeve and the drive shaft and movable longitudinally therewith at right angles to the main driver and angularly about the main driver with the body portion, change gears within the gear case, and a spindle rotatable within the sleeve and adjustable longitudinally therewith.

FRANK W. CURTIS.

DISCLAIMER 2,304,779.—*Frank W. Curtis*, Springfield, Mass. TOOLHEAD UNIT. Patent dated December 15, 1942. Disclaimer filed October 30, 1944, by the assignee, *Van Norman Company*.

Hereby enters this disclaimer to claims 1, 2, 5, and 6 of said patent.

[*Official Gazette November 21, 1944.*]